Dec. 15, 1942.   G. F. WEBB   2,305,367
TOOTH VITALITY TESTER
Filed Nov. 15, 1941
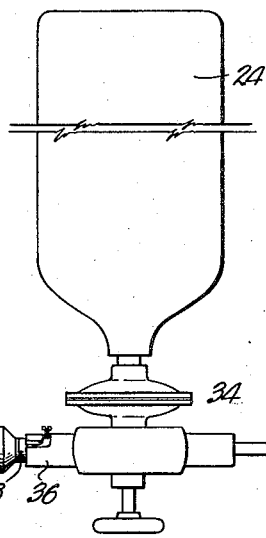
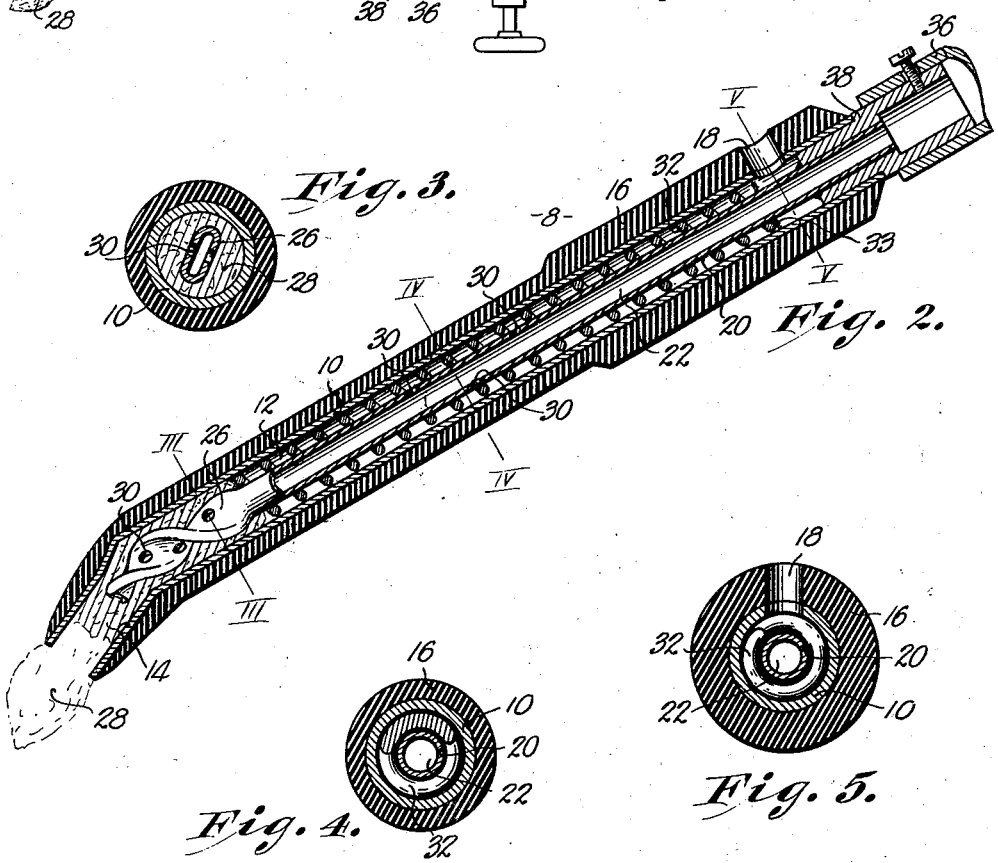
INVENTOR.
George Farrell Webb
BY
ATTORNEY.

Patented Dec. 15, 1942

2,305,367

UNITED STATES PATENT OFFICE 2,305,367

TOOTH VITALITY TESTER

George Farrell Webb, Kansas City, Mo.

Application November 15, 1941, Serial No. 419,308

11 Claims. (Cl. 62—1)

This invention relates to instruments of the character employed primarily by the dental profession, and has for its principal aim to provide means for thermally testing the vitality of teeth.

One of the important objects of this invention is the provision of an instrument for testing the vitality of teeth having as a part thereof, novel and unique elements for operably combining means for holding a quantity of freezable liquid and a part for conveying a freezing medium to said liquid from a source of supply, to the end that ice or a medium of relatively low temperature is created on an easily manipulatable body and that is capable of being applied directly to the member under test.

A further object of the instant invention is the provision of an instrument of the aforementioned character, wherein is included with the aforesaid, means for conveying a freezing medium to the liquid, unique and efficient exhausting units, one of which is a baffle disposed to retard the flow of the freezing medium and to govern the same to avoid detrimental effects and to insure quick freezing action.

Other objects of the invention are important and include specific structural details, the character of which will become apparent during the course of the following specification, referring to the accompanying drawing wherein:

Fig. 1 is a side elevational view of a tooth vitality tester, made in accordance with the present invention and showing the same operably joined to a source of supply of a freezing medium.

Fig. 2 is an enlarged longitudinal central sectional view through the instrument.

Fig. 3 is a cross sectional view taken on line III—III of Fig. 2.

Fig. 4 is a similar cross sectional view taken on line IV—IV of Fig. 2; and

Fig. 5 is a cross sectional view taken on line V—V of Fig. 2.

Because thermal testing of teeth to determine the vitality thereof is highly desirable and found to be advantageous, if satisfactory means for providing a medium of relatively low temperature is available, the instrument embodying the preferred form of this invention will fulfill all of the foregoing objects. It not only is necessary to provide an instrument whereon a quantity of ice may be quickly created, but one which such ice may be maintained over a period of time where testing is prolonged. To those skilled in the art therefore, the tester illustrated in the accompanying drawing must be considered as a fulfillment of the requirements incident to testing the vitality of teeth.

In the drawing the numeral 8 generally designates the body of the instrument which comprises a tube 10 having a cavity 12 therein, which is provided by the conventional bore of said tube 10. It is preferred to provide tube 10 with an angular extension 14 that may or may not be of slightly reduced diameter for the purpose more fully hereinafter set down.

A case 16 covering tube 10 should be produced of some material affording insulation against heat exchange and through both tube 10 and case 16 an exhaust port 18 is provided for the escape of excess freezing medium.

A conduit 20 extends longitudinally through tube 10 and provides a passage 22 to convey freezing medium from a source of supply 24 to a portion of cavity 12 near one end of body 8. Conduit 20 is formed by twisting as at 26 to create an anchor for a tuft of fibrous material 28 that is forced into cavity 12 and twisted to engage the spirally formed portion 26. This tuft of fibrous material is, in practice, an ordinary piece of absorbent cotton, soaked in water that is frozen solid by carbon dioxide from container 24.

Conduit 22 has a number of openings 30 in communication with cavity 12 and some of these openings 30 are within the tuft of cotton 28 or the body of ice formed at one end of the instrument.

Means for baffling the freezing medium as it passes from conduit 20 to exhaust port 18 is disposed within cavity 12 and here shown to be a spirally wound wire 32 formed of copper or other highly conductive material to promote heat exchange within the body. The numeral 33 designates a screen precluding escape of any solidified carbon dioxide from cavity 12.

Means for attaching body 8 to a source of supply 24 is, in the instance illustrated, merely a set of valves, generally designated by the numeral 34, and a fitting 36. This fitting 36 is usually a part of the carbon dioxide container assembly, and body 8 is equipped with an attaching unit 38 of conventional type. It is obvious that unit 38 may be in the form of a flexible conduit of desirable length and valved in an ordinary manner to provide means for continuously or intermittently supplying a freezing medium to the freezable liquid in the tuft 28.

It has been found practicable to directly connect body 8 to the container of carbon dioxide in the manner shown in Fig. 1, and allow the liquid from container 24 to pass into conduit 20 and thence therefrom, through openings 30, directly to tuft 28. Baffle 32 will retard the flow of the freezing medium through exhaust port 18 until the freezable liquid around the spirally formed portion 26 is solidified to seal openings 30, whereupon the freezing medium will escape through port 18 without injuring or displacing tuft 28. This tuft may be manipulated by the fingers of the operator to produce any outer contour desired and thereafter used to directly contact the tooth being tested.

Solidified carbon dioxide will appear in portions of the interstices of tuft 28 to produce a frozen cold mass applicable to the tooth. If an especially difficult situation is encountered and a lower temperature is necessary to complete the test, the tuft 28 may be entirely removed and the carbon dioxide in fluid form caused to pass from the open end of angular extension 14 directly upon a piece of material held in close proximity to the surface of the tooth. The solidified carbon dioxide collects at the zone of juncture between the end of the material (preferably of a substance that does not conduct heat), with a portion thereof on the tooth. When reaction occurs the material is withdrawn and carries therewith the solidified carbon dioxide that has served as the stimulus.

It is realized also that the instrument may assume various commercial forms without departing from the spirit of the invention or scope of the appended claims.

Having thus described the invention, what is claimed as new and desired to be secured by Letters Patent is:

1. An instrument for testing the vitality of teeth comprising a body; means on the body for holding a quantity of liquid; and a part mounted on the body for conveying a freezing medium to the liquid from a source of supply to convert the same to ice.

2. An instrument for testing the vitality of teeth comprising a body; means on the body for holding a quantity of liquid; and a part mounted on the body for conveying a freezing medium to the liquid from a source of supply to convert the same to ice, said means for holding the liquid being formable prior to the conversion of the liquid to ice to present desirable tooth-engaging contours.

3. An instrument for testing the vitality of teeth comprising a body having a cavity therein; a tuft or fibrous material within the cavity with a portion thereof extending exteriorly thereof; a part on the body for conveying a freezing medium to the tuft; and means for gripping the tuft to prevent accidental displacement thereof from the cavity.

4. An instrument for testing the vitality of teeth comprising a body having a cavity therein; a tuft of fibrous material within the cavity having a portion thereof extending exteriorly thereof; a passage provided in the body in communication with the cavity for conveying a freezing medium to the tuft from a source of supply; and an exhaust port formed in the body in communication with the passage.

5. An instrument for testing the vitality of teeth comprising a body having a cavity therein; a tuft of fibrous material within the cavity; a conduit extending into the cavity for conveying a freezing medium to the tuft; and means on the body for connecting the conduit with a source of supply of said freezing medium.

6. An instrument for testing the vitality of teeth comprising a body having a cavity therein; a tuft of fibrous material within the cavity; a conduit extending into the cavity for conveying a freezing medium to the tuft; and means on the body for connecting the conduit with a source of supply of said freezing medium; said body having an exhaust port in communication with the cavity, said conduit having openings through the wall thereof, placing into communication the conduit and said cavity, certain of said openings being within the tuft of fibrous material.

7. An instrument for testing the vitality of teeth comprising a body having a cavity therein; means for carrying a quantity of freezable liquid within the cavity; a conduit in the cavity disposed to convey a freezing medium to the liquid; and means on the body for connecting the conduit with a source of supply of said freezing medium.

8. An instrument for testing the vitality of teeth comprising a body having a cavity therein; means for carrying a quantity of freezable liquid within the cavity; a conduit in the cavity disposed to convey a freezing medium to the liquid; an exhaust port formed in the body; and a baffle in the cavity for retarding the flow of freezing medium to said exhaust port.

9. An instrument for testing the vitality of teeth comprising a body having a cavity therein; means for carrying a quantity of freezable liquid within the cavity; a conduit in the cavity disposed to convey a freezing medium to the liquid; an exhaust port formed in the body; a baffle in the cavity for retarding the flow of freezing medium to said exhaust port; and openings provided in the conduit disposed to direct the freezing medium into the cavity.

10. An instrument for testing the vitality of teeth comprising a body having a cavity therein; means for carrying a quantity of freezable liquid within the cavity; a conduit in the cavity disposed to convey a freezing medium to the liquid; an exhaust port formed in the body; a baffle in the cavity for retarding the flow of freezing medium to said exhaust port; and openings provided in the conduit disposed to direct the freezing medium into the cavity, certain of said openings being within the quantity of freezable liquid.

11. An instrument for testing the vitality of teeth comprising a body having a cavity therein; means for carrying a quantity of freezable liquid within the cavity; a conduit in the cavity disposed to convey a freezing medium to the liquid; an exhaust port formed in the body; a baffle in the cavity for retarding the flow of freezing medium to said exhaust port; and openings provided in the conduit disposed to direct the freezing medium into the cavity, said conduit having a portion thereof formed to create an anchor for the liquid after the same is frozen.

GEORGE FARRELL WEBB.